United States Patent [19]

Wang

[11] Patent Number: 5,583,964
[45] Date of Patent: Dec. 10, 1996

[54] COMPUTER UTILIZING NEURAL NETWORK AND METHOD OF USING SAME

[75] Inventor: Shay-Ping T. Wang, Long Grove, Ill.

[73] Assignee: Motorola, Inc., Schaumburg, Ill.

[21] Appl. No.: 235,996

[22] Filed: May 2, 1994

[51] Int. Cl.$^6$ .............................. G06F 15/16; G06F 15/18
[52] U.S. Cl. .................................. 395/11; 395/24; 395/23
[58] Field of Search ...................................... 382/155–159; 395/20–25, 27, 10–11, 76, 50–51

[56] References Cited

U.S. PATENT DOCUMENTS

| | | | |
|---|---|---|---|
| 5,014,219 | 5/1991 | White | 395/23 |
| 5,142,666 | 8/1992 | Yoshizawa et al. | 395/24 |
| 5,182,794 | 1/1993 | Gasperi et al. | 395/23 |
| 5,204,938 | 4/1993 | Skapura et al. | 395/27 |
| 5,274,743 | 12/1993 | Imondi et al. | 395/23 |
| 5,398,300 | 3/1995 | Levey | 395/22 |
| 5,408,588 | 4/1995 | Ulug | 395/23 |
| 5,438,644 | 8/1995 | Fu | 395/22 |
| 5,450,529 | 9/1995 | Bigus | 395/76 |

OTHER PUBLICATIONS

Saarinen et al, "parallel coprocessor for kohonen's self-organizing neural network;" Proceedings. Sixth international parallel processing symposium, pp. 537–542, 23–26 Mar. 1992.

Graf et al, "image recognition with an analog neural net chip;" Proceedings. 11th IAPR international conference on pattern recognition, pp. 11–14, 30 Aug. –3 Sep. 1992.

Mueller et al, "a neural network systems component;" 1993 IEEE International conference on neural networks, pp. 1258–1264 vol. 3, 28 Mar.–1 Apr. 1993.

Speckmann et al, "coprocessors for special neural networks KOKOS and KOBOLD;" 1994 IEEE International conference on neural networks, pp. 1959–1962 vol. 3 27 Jun. –2 Jul. 1994.

Primary Examiner—Robert W. Downs
Assistant Examiner—Tariq R. Hafiz
Attorney, Agent, or Firm—Michael K. Lindsey; Bruce E. Stuckman; Walter W. Nielsen

[57] ABSTRACT

A computing device, which may be implemented as an integrated circuit, is constructed of a microprocessor and one or more neural network co-processors. The microprocessor normally executes programs which transfer data to the neural network co-processors, which are used to compute complicated mathematical functions. Direct Memory Access (DMA) is also used to transfer data. Each neural network co-processor interfaces to the microprocessor in a manner substantially similar to that of a conventional memory device. The co-processor does not require any instructions and is configured to execute mathematical operations simply by being pre-loaded with gating functions and weight values. In addition, the co-processor executes a plurality of arithmetic operations in parallel, and the results of such operations are simply read from the co-processor.

41 Claims, 6 Drawing Sheets

−PRIOR ART−

*FIG.1*

−PRIOR ART−

*FIG.2*

−PRIOR ART−

COMPUTER UTILIZING NEURAL NETWORK AND METHOD OF USING SAME

RELATED INVENTIONS

The present invention is related to the following inventions which are assigned to the same assignee as the present invention:

(1) "Artificial Neuron Using Adder Circuit and Method of Using Same", having Ser. No. 08/076,602 now U.S. Pat. No. 5,390,136.

(2) "Neural Network and Method of Using Same", having Ser. No. 08/076,601.

The subject matter of the above-identified related inventions is hereby incorporated by reference into the disclosure of this invention.

TECHNICAL FIELD

This invention relates generally to computer architectures and, in particular, to a computer architecture that utilizes a microprocessor and at least one neural network co-processor which can perform high speed parallel computation and be implemented in a VLSI (very large scale integration) chip.

BACKGROUND OF THE INVENTION

Artificial neural networks have utility in a wide variety of computing environments, such as speech recognition, process control, optical character recognition, signal processing, and image processing. Processing engines for many of the foregoing may be implemented through neural networks comprising a plurality of elemental logic elements called neuron circuits.

A neuron circuit is the fundamental building block of a neural network. A neuron circuit has multiple inputs and one output. As described in the Related Invention No. 1 identified above, the structure of a conventional neuron circuit often includes a multiplier circuit, a summing circuit, a circuit for performing a non-linear function (such as a binary threshold or sigmoid function), and circuitry functioning as synapses or weighted input connections. The above-identified Related Invention No. 1 discloses, in one embodiment, a neuron circuit which comprises only an adder as its main processing element.

As discussed in Related Invention No. 2 identified above, there are more than twenty known types of neural network architectures, of which the "back-propagation", "perceptron", and "Hopfield network" are the best known. Related Invention No. 2 discloses, in one embodiment, a neural network which does not require repetitive training, which yields a global minimum to each given set of input vectors, and which has an architecture that is easy to implement.

As is known, conventional processing engines (yon Neumann type) comprise two fundamental blocks, a computing unit and a memory unit from which the computing unit accesses instructions and data to sequentially execute its functions. The only method available to increase the computing power thereof is to increase the computing speed, and thus through an increase in the number of operations executable per unit of time.

Figure 1:
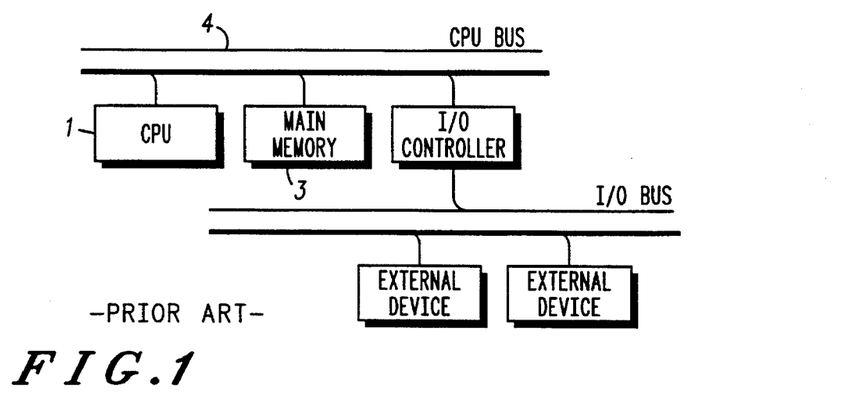
FIG. 1 shows a prior art von Neumann computer.

FIG. 1 shows a prior art yon Neumann type processing engine. To perform a function in general, CPU 1 (central processing unit) repetitively executes the following sequential steps which form the basis of operation for any yon Neumann computer. First, CPU 1 retrieves an instruction from main memory 3 via CPU Bus 4. Next, CPU 1 fetches data from main memory 3 and performs an arithmetic or logical operation on the data according to the aforesaid instruction. Finally, CPU 1 stores the result of the executed operation in main memory 3.

The primary limitation of the yon Neumann computer is that it performs only one operation at a time, and although the operation may occur in a very short time, the mere fact that operations are executed serially precludes a dramatic increase in computational speed. As a result, computer architectures have been conceived that are capable of executing operations concurrently.

Figure 2:
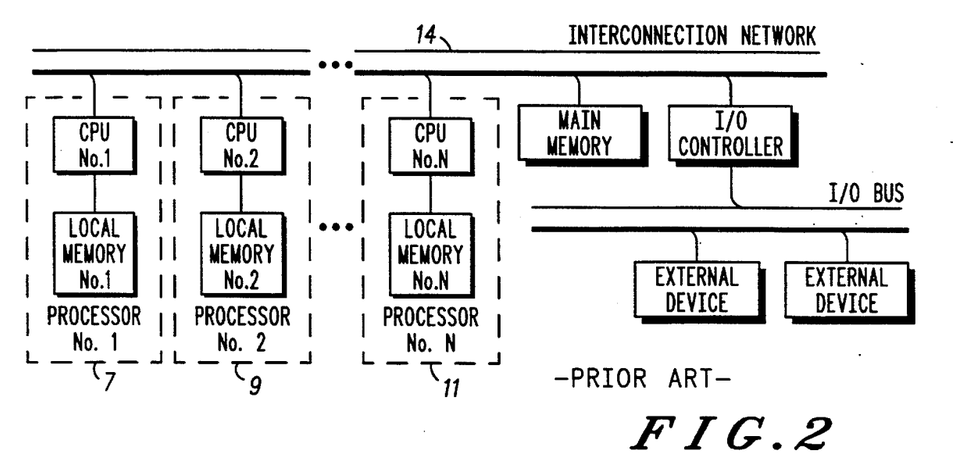
FIG. 2 shows a prior art multiple-processor computer.

FIG. 2 shows a prior art multiple-processor computer. The multiple-processor computer comprises a plurality of yon Neumann computers 7, 9, 11 that communicate with each other via an interconnection network 14. By the fact that it can execute a multitude of operations at one time, the multiple-processor computer affords increased computing power over the traditional yon Neumann computer. However, the multiple-processor computer is expensive and difficult both to implement and to program. Executing software applications on a multiple-processor computer requires a sophisticated compiler. In addition, communication between processors frequently results in "communication bottlenecks" which degrade the overall computing power of the multiple-processor computer.

Figure 3:
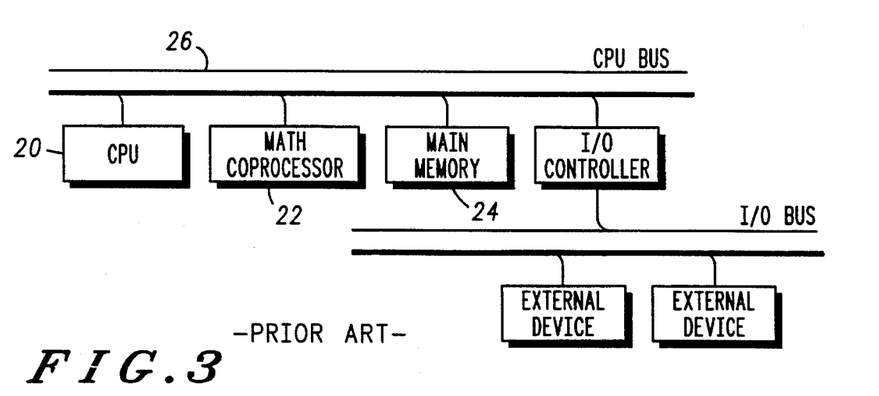
FIG. 3 shows a prior art yon Neumann computer with a math co-processor.

FIG. 3 shows a prior art yon Neumann computer with a math co-processor. CPU 20 is connected to math co-processor 22 and main memory 24 via CPU bus 26. CPU 20 generally performs the same functions as the above-described CPU 1 of FIG. 1. But, in addition, CPU 20 controls the operation of and data transfer to math co-processor 22. Math co-processor 20 is a logic circuit that is specially designed to perform mathematical computations in significantly less time than CPU 20. Typically, a math co-processor comprises specialized electronic circuitry to perform arithmetic operations such as floating point division and multiplication, and transcendental functions such as sine, cosine, tangent, etc. Even though a math co-processor may increase Computing power, the architecture depicted by FIG. 3 suffers from the fundamental limitation of being able to execute only one operation at a time. In addition, the math functions that are accelerated by the co-processor are pre-determined by the circuitry of the math co-processor and are thus limited in number and not software re-configurable.

The above described prior art configurations provide satisfactory computing power under some, but not all, circumstances. In situations requiring intensive mathematical computation, prior art solutions generally fail to deliver adequate computing performance at a reasonable price. Thus, there is a significant need for a computing device which performs a wide variety of complicated math functions, which executes a large number operations per unit time, and which is easy to program and inexpensive to implement.

SUMMARY OF INVENTION

The limitations cited above and others are substantially met through provision of the computing device disclosed herein. In one embodiment of the present invention there is provided a computing device comprising a microprocessor which is connected to at least one neural network co-processor.

According to one aspect of the invention, there is provided a computing device comprising a microprocessor for executing general purpose programs, wherein the microprocessor has at least one output port for transmitting data and at least one input port for receiving data; and a neural network co-processor for performing mathematical computations, wherein the co-processor is responsive to the at least one microprocessor output port and generates at least one output, and wherein the microprocessor input ports are responsive to the at least one co-processor output.

According to another aspect of the invention, there is provided a computing device comprising a microprocessor for executing general purpose programs, the microprocessor having at least one output port for transmitting data and at least one input port for receiving data, and at least one neural network co-processor for performing mathematical computations. The co-processor is responsive to the at least one output port of the microprocessor and generates at least one co-processor output. The at least one microprocessor input port is responsive to the at least one co-processor output, the co-processor comprising a plurality of first memory means for storing gating functions, and a plurality of second memory means for storing weight values. A method of operating the computing device comprises the following steps: (a) the microprocessor transmits gating functions to the plurality of first memory means; (b) the microprocessor transmits weight values to the plurality of second memory means; (c) the microprocessor transmits at least one co-processor input to the at least one neural network co-processor; and (d) the co-processor computes a mathematical function, utilizing the gating functions, the weight values, and the at least one co-processor input, and the co-processor generates the at least one co-processor output as a result of computing the mathematical function.

In contrast to conventional computing devices, a computing device constructed in accordance with the present invention utilizes a neural network co-processor which is software configurable to perform a wide variety of mathematical functions and which is easy to program. In one embodiment, the neural network co-processor is configured by the microprocessor simply transferring a plurality of predetermined data values to the co-processor. Thus, it is an advantage of the present invention to provide a computing device which comprises a co-processor which doesn't require a set of computer instructions and which has a simple interface, similar to that of a conventional memory device.

Further, in contrast to conventional computing devices, a computing device constructed in accordance with the present invention utilizes a neural network co-processor which executes arithmetic operations concurrently and thus provides a vast increase in computing power.

Thus it will be appreciated that a computing device constructed in accordance with the present invention performs at a vast reduction in computational time, and with a vast reduction in the cost and complexity of programming and implementation.

It is therefore an advantage of the present invention to provide a computing device which performs complicated mathematical functions with an immense increase in computational speed and a significant reduction in cost.

It is a further advantage of the present invention to provide a computing device which comprises at least one neural network co-processor embedded in a microprocessor chip. This provides a significant reduction in the area needed to implement the computing device.

Another advantage of the present invention is to provide a computing device that comprises a neural network co-processor which executes mathematical operations concurrently and which is software configurable to compute a multitude of different mathematical functions.

Yet another advantage of the present invention is to provide a computing device which utilizes direct memory access (DMA) to transfer blocks of data between at least one neural network co-processor and other devices via an interconnecting bus, resulting in a computing device with a much larger throughput.

It is also an advantage of the present invention to provide a method of operating a computing device in accordance with the present invention.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

It will be understood by one of ordinary skill in the art that the computing device of the present invention may be implemented in an integrated circuit, printed circuit board, or a combination thereof, and that the terms "central processing unit" (CPU), "general purpose processor", and "microprocessor" are used interchangeably in this description, as are the terms "neuron circuit" and "neuron", and "summing circuit"/"summer", etc.

Figure 4:
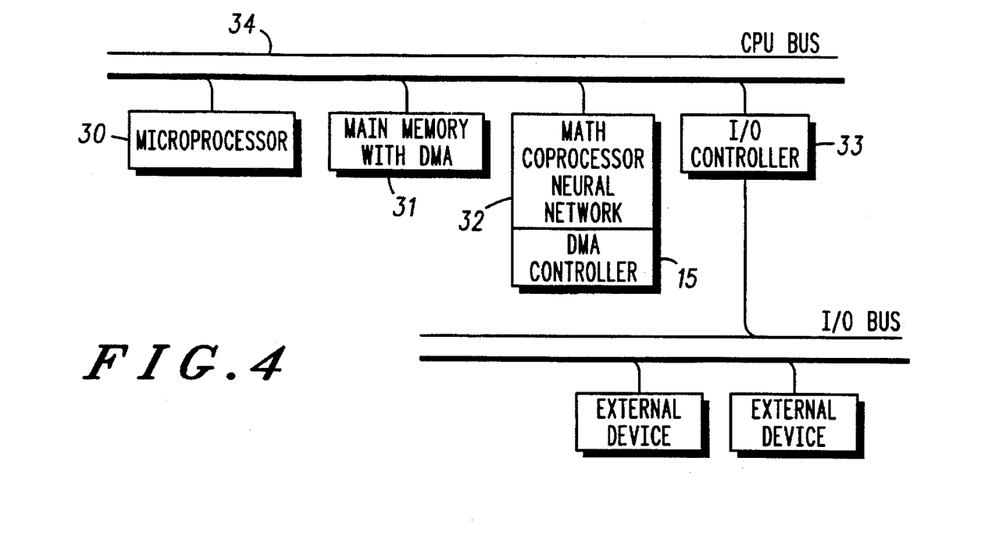
FIG. 4 shows a conceptual diagram of a computing device which comprises a neural network co-processor and a microprocessor, in accordance with a preferred embodiment of the present invention.

FIG. 4 shows a conceptual diagram of a computing device which comprises a neural network co-processor and a microprocessor, in accordance with a preferred embodiment of the present invention. Microprocessor 30 is a CPU or any other digital control means that comprises a general purpose processing unit. Microprocessor 30 is connected by bus 34 to main memory 31, I/O controller 33, and neural network co-processor 32. The microprocessor executes general purpose programs and may also control the flow of data between devices which are connected to bus 34. The I/O controller is a device which controls the flow of data between bus 34 and external devices that are not connected to bus 34.

Bus 34 is a digital bus, and it will be apparent to one skilled in the art that the width of the bus may be 8, 16, 32, or any other desired number of bits.

Microprocessor 30 executes software programs that are usually stored in main memory 31. However, it will be understood by one skilled in the art that microprocessor 30 may comprise internal memory which may also be used to store executable software programs.

Although microprocessor 30 is a general purpose processor which is capable of executing a plurality of different algorithms, it may in certain circumstances be generally acceptable in a preferred embodiment to limit the functions of microprocessor 30 to controlling the main memory, the neural network co-processor, and data transfers across the bus. It will be understood by one of ordinary skill that data transfers may be accomplished by microprocessor 30 simply executing a series of instructions which move data across bus 34. However, in a preferred embodiment of the present invention, a technique called direct memory access (DMA) is generally used to transfer data via the bus.

DMA may be used to transfer data between any of the devices attached to the bus. In a preferred embodiment, DMA is used namely to transfer data between the neural network co-processor 32 and the other devices. Microprocessor control is not required during a DMA transfer of data; thus, the microprocessor is free to perform other tasks during a DMA transfer. Generally, during a DMA transfer, large streams of data are transferred across the bus without interruption.

A DMA controller 15, which in a preferred embodiment is included in the neural network co-processor 32, initiates a DMA transfer between two devices, both of which are attached to bus 34, by signaling one device to write data onto the bus and signaling the other device to simultaneously read the same data from the bus. Although the DMA control means is shown in FIG. 4 as residing in co-processor 32, it will be apparent to one skilled in the art that the DMA control means may also be included in microprocessor 30, main memory 31, I/O controller 33, or as a separate device attached to bus 34. It will also be apparent to one of ordinary skill that data written onto bus 34 during a DMA transfer may be simultaneously read by one or more of the devices attached to the bus.

Co-processor 32 may receive data from any of the other devices attached to bus 34, including main memory 31, I/O controller 33, and microprocessor 30, and it may output data to any other device on the bus, including main memory 31, I/O controller 33, and microprocessor 30. The data received by co-processor 32 include gating functions, neuron weight values (polynomial coefficients), and co-processor inputs, wherein the meanings of these data in the present invention are described below.

The neural network co-processor 32 generally serves to compute polynomial expansions. The forms of polynomial expansions which may be computed by co-processor 32 are described below in detail.

Figure 5:
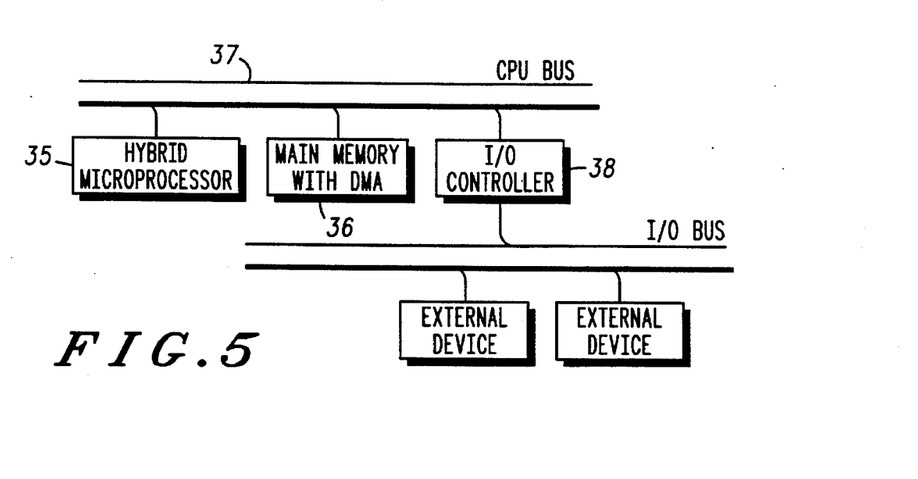
FIG. 5 shows a conceptual diagram of a computing device which comprises at least one neural network co-processor and a microprocessor embedded in the same integrated circuit, in accordance with a preferred embodiment of the present invention.

FIG. 5 shows a conceptual diagram of a computing device which comprises at least one neural network co-processor and a microprocessor embedded in the same integrated circuit, in accordance with a preferred embodiment of the present invention. The advantage of having neural network co-processors embedded with a microprocessor in a single chip is that the computing device consumes less power and space.

Hybrid microprocessor 35 is an integrated circuit which comprises a microprocessor and at least one neural network co-processor. The microprocessor contained in hybrid microprocessor 35 performs functions similar to that of microprocessor 30 of FIG. 4, and likewise, main memory 36, bus 37, and I/O controller 38 serve purposes similar to that of above-described main memory 31, bus 34, and I/O controller 33, respectively, of FIG. 4. Hybrid microprocessor 35, main memory 36, and I/O controller 38 are connected by data bus 37.

The neural network co-processors contained in hybrid microprocessor 35 generally serve to compute polynomial expansions. The forms of polynomial expansions which may be computed by the neural network co-processors are described in detail below.

Additionally, the neural network co-processors of hybrid microprocessor 35 may receive data from the microprocessor or any device attached to bus 37, including main memory 36 and I/O controller 38, and they may output data to the microprocessor or any device on the bus, including main memory 36 and I/O controller 38. The data received by the neural network co-processors include gating functions, neuron weight values (polynomial coefficients), and co-processor inputs, wherein the meanings of these data in the present invention are described below.

A DMA control means is also included in the computing device depicted by FIG. 5. The function of the DMA control means of FIG. 5 is equivalent to that of the above described DMA control means of FIG. 4. In a preferred embodiment, the DMA control means resides in main memory 36; however, it will be apparent to one skilled in the art that the DMA control means may reside in hybrid microprocessor 35, I/O controller 38, or as a separate device attached to bus 37. It will also be apparent to one of ordinary skill that data written onto bus 37 during a DMA transfer may be simultaneously read by one or more of the devices attached to the bus.

Figure 6:
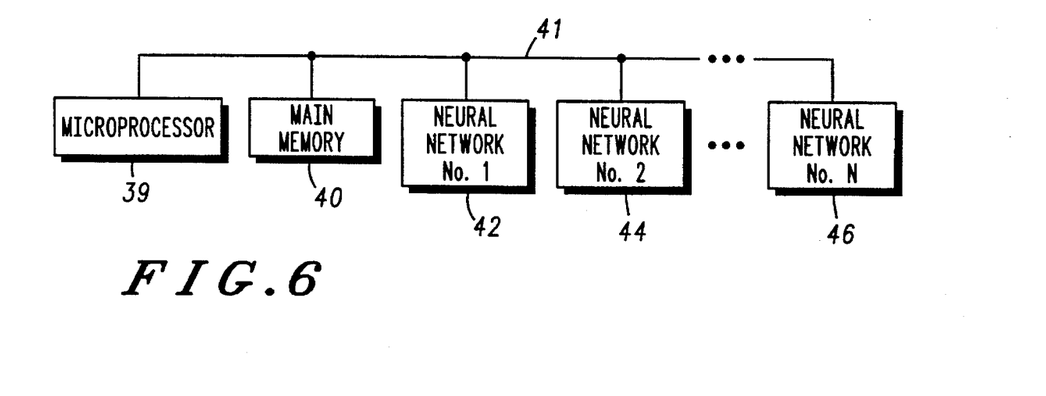
FIG. 6 shows a conceptual diagram of a computer architecture which comprises a microprocessor with a plurality of neural network co-processors, in accordance with the present invention.

FIG. 6 shows a conceptual diagram of a computing device which comprises a microprocessor with a plurality of neural network co-processors, in accordance with the present invention. Microprocessor 40 performs functions similar to that of microprocessor 30 of FIG. 4, and likewise, main memory 39 and bus 41 serve purposes similar to that of above-describe main memory 31 and bus 34, respectively, of FIG. 4.

A DMA control means which is equivalent to that of FIG. 5 may be included in the computing device shown in FIG. 6.

Neural network co-processors 42, 44, and 46 may receive data from microprocessor 40 or any device attached to bus 41, including main memory 39 or other neural network co-processors, and they may output data to microprocessor 40 or any device on the bus, including main memory 39 or other neural network co-processors. The data received by the neural network co-processors include gating functions, neuron weight values (polynomial coefficients), and co-processor inputs, wherein the meanings of these data in the present invention are described below.

The neural network co-processors 42, 44, and 46 generally serve to compute polynomial expansions. The forms of polynomial expansions which may be computed by the neural network co-processors are described in detail below.

The advantage of the computing device depicted in FIG. 6 is that the neural network co-processors allow a greater number of computations to be executed in parallel, and as a consequence the computing power of the device increases dramatically.

While FIG. 6 shows only three neural network co-processors in the computing device, it will be understood by one of ordinary skill that any number of neural network co-processors may be used if a particular application requires more or less than three co-processors.

Each neural network co-processor may be used to compute a different polynomial expansion concurrently. For example, neural network co-processor 42 may compute $y_1=1.02+5.6x_1+3x_2$, while neural network co-processor 44 computes $y_2=3 \ 14x_1^3+11x_2^2$ while neural network co-processor 46 computes $y_3=0.2x_2^2$, wherein $x_1$ and $x_2$ are co-processor inputs transferred to each of the co-processors by microprocessor 40 and $y_1$, $y_2$, and $y_3$ are values that are output from co-processors 42, 44, and 46, respectively.

It will be understood by one of ordinary skill that the neural network co-processor of the present invention is not limited to computing the three polynomial expansions $y_1$, $y_2$, and $y_3$ shown in the above example and that the above example places no limitations on the forms of polynomial expansions which can be computed by the computing device disclosed herein. Furthermore, it will be apparent to those skilled in the art that one or any desired number of neural network co-processors may be used to concurrently compute the polynomial expansions $y_1$, $y_2$, and $y_3$ shown above.

The operation of the neural network co-processor of the present invention is based upon the use of a polynomial expansion and, in a loose sense, the use of an orthogonal function, such as sine, cosine, exponential/logarithmic, Fourier transformation, Legendre polynomial, non-linear basis function such as a Volterra function or a radial basis function, or the like, or a combination of polynomial expansion and orthogonal functions.

A preferred embodiment employs a polynomial expansion of which the general case is represented by Equation 1 as follows:

$$y = \sum_{i=1}^{\infty} w_{i-1} x_1^{g_{1i}} x_2^{g_{2i}} \ldots x_n^{g_{ni}} \qquad \text{Equation 1}$$

wherein $x_i$ represent the co-processor inputs and can be a function such as $x_i=f_i(z_j)$, wherein $z_j$ is any arbitrary variable, and wherein the indices i and j may be any positive integers; wherein y represents the output of the neural network co-processor; wherein $w_{i-1}$ represent the weight for the ith neuron; wherein $g_{1i}, \ldots, g_{ni}$ represent gating functions for the ith neuron and are integers, being 0 or greater in a preferred embodiment; and n is the number of co-processor inputs.

Each term of Equation 1 expresses a neuron output and the weight and gating functions associated with such neuron. The number of terms of the polynomial expansion to be used in a neural network is based upon a number of factors, including the number of available neurons, the number of training examples, etc. It should be understood that the higher order terms of the polynomial expansion usually have less significance than the lower order terms. Therefore, in a preferred embodiment, the lower order terms are chosen whenever possible, based upon the various factors mentioned above. Also, because the unit of measurement associated with the various inputs may vary, the inputs may need to be normalized before they are used.

Equation 2 is an alternative representation of Equation 1, showing terms up to the third order terms.

$$y = w_0 + \sum_{i=1}^{n} w_i x_i + \sum_{i=1}^{n} w_{f1(i)} x_i^2 + \sum_{i=1}^{n}\sum_{j=i+1}^{n} w_{f2(i,j)} x_i x_j + \qquad \text{Equation 2}$$

$$\sum_{i=1}^{n} w_{f3(i)} x_i^3 + \sum_{i=1}^{n}\sum_{j=i+1}^{n} w_{f4(i,j)} x_i^2 x_j + \sum_{i=1}^{n}\sum_{j=i+1}^{n} w_{f5(i,j)} x_i x_j^2 +$$

$$\sum_{i=1}^{n}\sum_{j=i+1}^{n}\sum_{k=i+j+1}^{n} w_{f6(i,j,k)} x_i x_j x_k + \ldots$$

wherein the variables have the same meaning as in Equation 1 and wherein $f_{1(i)}$ is an index function in the range of n+1 to 2n; $f_{2(i,j)}$ is an index function in the range of 2n+1 to 2n+(n)(n−1)/2; and $f_{3(i,j)}$ is in the range of 2n+1+(n)(n−1)/2 to 3n+(n)(n−1)/2. And $f_4$ through $f_6$ are represented in a similar fashion.

Those skilled in the art will recognize that the gating functions are embedded in the terms expressed by Equation 2. For example, Equation 2 can be represented as follows:

$$y = w_0 + w_1 x_1 + w_2 x_2 + \ldots w_i x_i + \ldots + w_n x_n + w_{n+1} x_1^2 + \qquad \text{Equation 3}$$

$$\ldots + w_{2n} x_n^2 + w_{2n+1} x_1 x_2 + w_{2n+2} x_1 x_3 + \ldots + w_{3n-1} x_1 x_n +$$

$$w_{3n} x_2 x_3 + w_{3n+1} x_2 x_4 + \ldots w_{2n+(n)(n-1)/2} x_{n-1} x_n + \ldots +$$

$$w_{n-1} x_1^{g_{1N}} x_2^{g_{2N}} \ldots x_n^{g_{nN}} + \ldots$$

wherein the variables have the same meaning as in Equation 1.

It should be noted that although the gating function terms $g_{in}$ explicitly appear only in the last shown term of Equation 3, it will be understood that each of the other terms has its $g_{iN}$ term explicitly shown (e.g. for the $w_1 x_1$ term $g_{12}=1$ and the other $g_{12}=0$, i=2,3, . . . ,n). N is any positive integer and represents the Nth neuron in the network.

Figure 7:
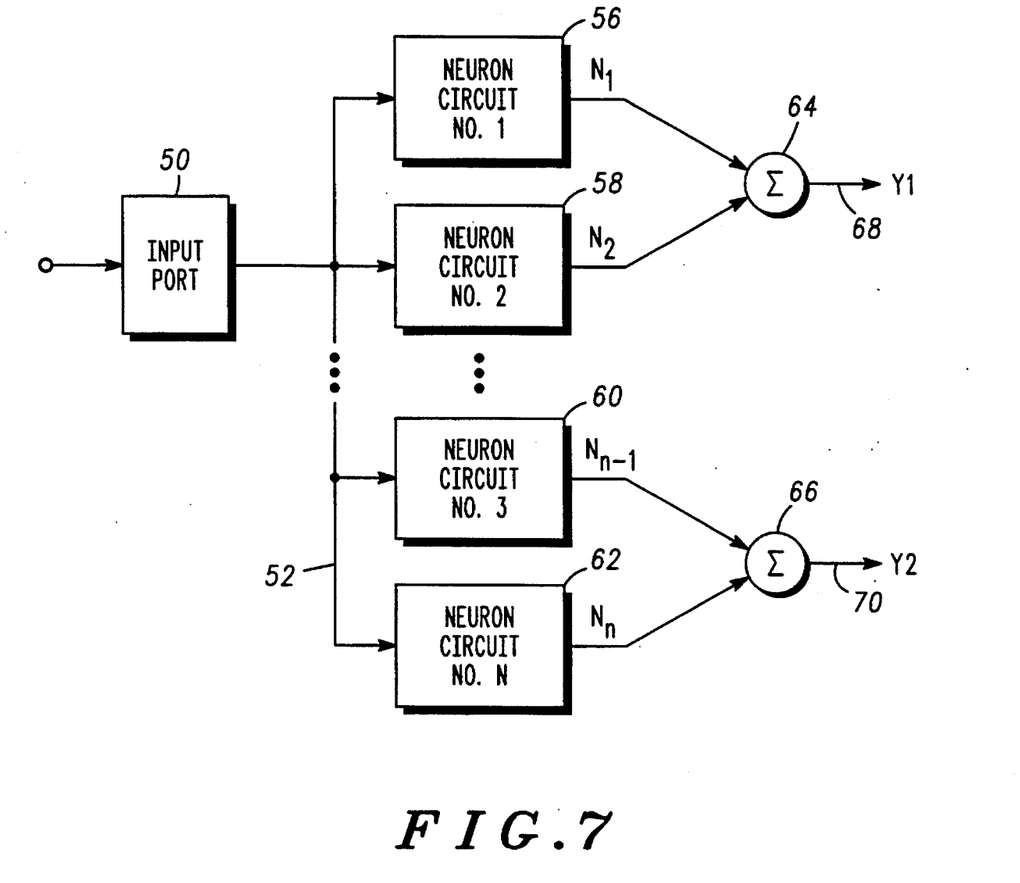
FIG. 7 shows a conceptual diagram of a neural network co-processor whose inputs are received sequentially and which has a plurality of outputs, in accordance with a preferred embodiment of the present invention.

FIG. 7 shows a conceptual diagram of a neural network co-processor whose inputs are received sequentially and which has a plurality of outputs, in accordance with a preferred embodiment of the present invention.

A plurality of co-processor inputs $x_1, x_2, \ldots, x_n$ is fed to input port 50. The output of the input port, $x_1, x_2, \ldots, x_n$, is successively distributed via bus 52 to each neuron circuit 56, 58, 60, and 62 of the hidden layer. Although only four neuron circuits, $N_1, N_2, N_{n-1}$, and $N_n$, are shown, the hidden layer may comprise any number of neuron circuits. In other words, the output of the input port is successively distributed via the bus to each of neuron circuits 56, 58, 60, and 62 and to all other neuron circuits (not shown) in the hidden layer.

In a preferred embodiment of the present invention, each neuron applies a gating function, $g_{ni}$, to each of the co-processor inputs to produce corresponding gated inputs, wherein the variable, g, and the subscripts, i and n, have the same meanings as in Equation 1 given above. Any given neuron circuit may apply a different gating function to each different co-processor input it receives. For example, neuron 56 applies a gating function $g_{11}$ to co-processor input $x_1$ it receives from input port 50; it applies a gating function $g_{21}$ to co-processor input $x_2$; and so forth. The gated inputs are multiplied together by the neuron to form a product, which is then multiplied by a weight, $w_{i-1}$, to produce the neuron circuit output, wherein the variable, w, and subscript, i, have the same meanings as in Equation 1 given above.

Neuron circuit outputs are summed by summing circuits of the output layer of the co-processor to produce co-processor outputs. For example, the outputs of neuron circuits 56 and 58 are summed by summing circuit 64 to produce neural network co-processor output $y_1$, and the outputs of neuron circuit 60 and 62 are summed by summing circuit 66 to produce neural network co-processor output $y_n$.

While FIG. 7 shows only two summing circuit in the output layer, it will be understood by one of ordinary skill that the co-processor may comprise any number of summing circuits. Furthermore, the output of each neuron circuit may be received by any of one the summer circuits as well as being received by more than one summer circuit.

A plurality of weights $w_0, w_1, \ldots, w_{i-1}$ is fed to input port 50, wherein the variable, w, and subscript, i, have the same meanings as in Equation 1 given above. Generally, there is at least one weight corresponding to each neuron circuit. The weights are sequentially distributed via bus 52 to their corresponding neuron circuit. As described in above-identified Related Invention No. 1, each neuron circuit comprises a means for storing weights. The weight stored by each neuron circuit may be periodically updated depending on circumstances under which the herein-disclosed computing device is operating. If more than one weight is being stored by a neuron circuit, then each weight may be individually accessed, or plurally accessed in parallel, by either the DMA control means or the microprocessor.

Figure 8:
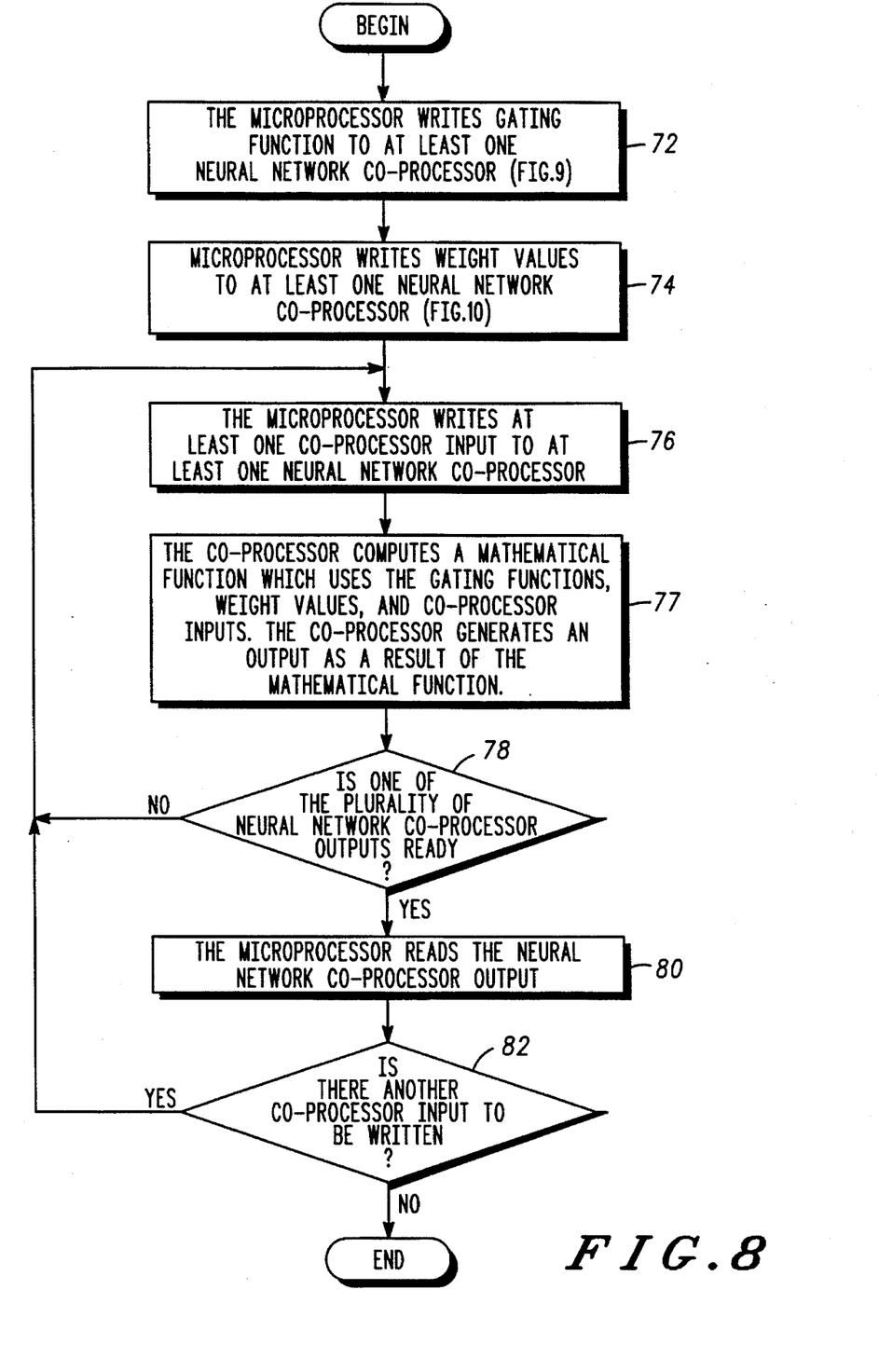
FIG. 8 shows a flow diagram of a method of operating each of the computing devices illustrated in FIG. 4, FIG. 5, and FIG. 6.

A plurality of gating functions $g_{11}, g_{12}, \ldots, g_{ni}$ are fed to input port 50, wherein the variable, g, and the subscripts, i and n, have the same meanings as in Equation 1 given above. Generally, there is a plurality of gating functions corresponding to each neuron circuit. The gating functions are sequentially distributed via bus 52 to their corresponding neuron circuit. In a preferred embodiment of the present invention, each neuron circuit comprises a means for storing its corresponding plurality of gating functions. The gating functions of each neuron circuit may be periodically updated depending on circumstances under which the herein-disclosed computing device is operating. The means for storing allows gating functions to be either individually accessed or plurally accessed in parallel by either the DMA control means or the microprocessor FIG. 8 shows a flow diagram of a method of operating each of the computing devices illustrated in FIG. 4, FIG. 5, and FIG. 6. As illustrated in box 72, at least one gating function is written to the neural network co-processors. Although box 72 indicates a microprocessor writing the gating function, it will be apparent to one of ordinary skill that a DMA control means may also perform the write. Any number of gating functions may be written to one or any number of neural network co-processors.

Next, as illustrated in box 74, at least one weight is written to the neural network co-processors. Although box 74 indicates a microprocessor writing the weight, it will be apparent to one of ordinary skill that a DMA control means may also perform the write. Any number of weights may be written to one or any number of neural network co-processors.

Next, as illustrated in box 76, at least one co-processor input is written to the neural network co-processors. More than one co-processor input may be transferred, either sequentially or concurrently, to the co-processor during this step. In addition, co-processor inputs may be written simultaneously to a plurality of predetermined ones of neural network co-processors. Although box 76 indicates a microprocessor writing the co-processor input, it will be apparent to one of ordinary skill that a DMA control means may also perform the write.

As illustrated in box 77, the neural network co-processor computes a mathematical function which utilizes the gating functions, weight values, and co-processor inputs. The co-processor generates an output as a result of computing the mathematical function.

Next, as illustrated in decision box 78, a check is made to see whether one of the neural network co-processor outputs is ready to be read. Either a microprocessor or a DMA control means may make this decision. If none of the outputs are ready to be read, then the procedure returns to box 76. Otherwise, it proceeds to box 80.

Next, regarding box 80, the co-processor outputs that are ready are read by either a microprocessor or a DMA control means.

Finally, as illustrated in decision box 82, a check is made to determine whether there are any further co-processor inputs to be written to the co-processors. If there are more co-processor inputs to be written, then the procedure returns to box 76, otherwise the procedure terminates.

Figure 9:
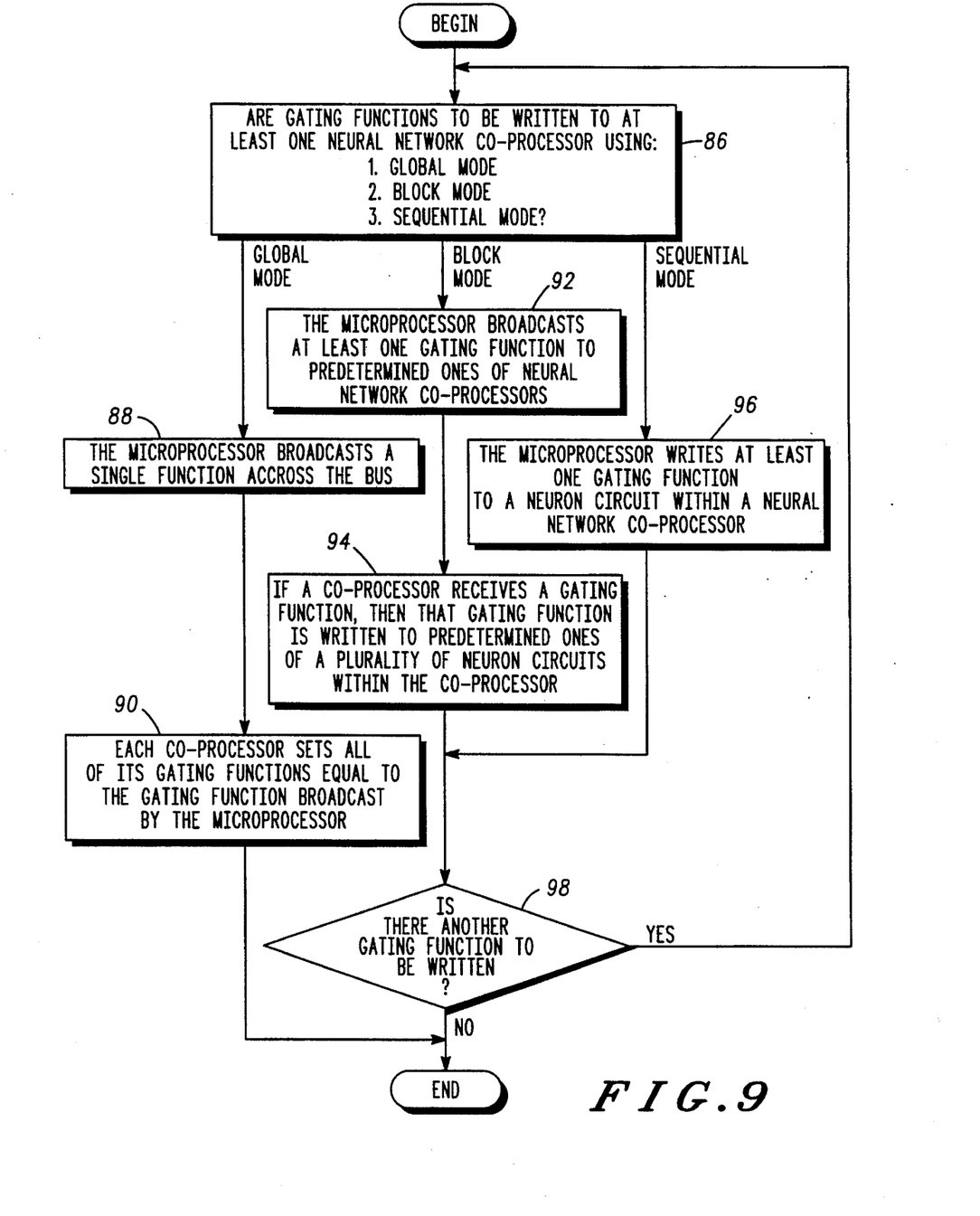
FIG. 9 shows a method of writing gating functions to the neural network co-processor in accordance with a preferred embodiment of the invention.

FIG. 9 shows a method of writing gating functions to the neural network co-processor in accordance with a preferred embodiment of the invention. As illustrated in decision box 86, a check is made to determine whether the gating functions are to be written using global mode, sequential mode, or block mode. If gating functions are to be written using global mode, then the procedure proceeds to box 88. If gating functions are to be written using block mode, then the procedure proceeds to box 92. If gating functions are to be written using sequential mode, then the procedure proceeds to box 96.

Regarding box 88, a global mode transfer is accomplished by broadcasting a single gating function across the bus to all neural network co-processors, wherein there may be one or any number of co-processors attached to the bus. Although box 88 indicates a microprocessor broadcasting the gating function, it will be apparent to one of ordinary skill that a DMA control means may broadcast the value.

Next, as illustrated in box 90, each co-processor sets all of its gating functions equal to the gating function which was broadcast. Upon exiting box 90, the procedure terminates.

Block mode transfer of gating functions begins upon entering box 92. As illustrated in box 92, block mode transfers are achieved by simultaneously broadcasting one or more gating functions to predetermined ones of the neural network co-processors. Although box 92 indicates a microprocessor broadcasting the gating functions, it will be apparent to one of ordinary skill that a DMA control means may broadcast the values.

Next, as illustrated in box 94, if a co-processor receives at least one gating function, then the at least one gating function is written to predetermined ones of a plurality of neuron circuits within the co-processor.

Next, as illustrated in decision box 98, a check is made to determine whether there are any further gating functions to be written to the co-processors. If there are more gating functions to be written, then the procedure returns to box 86, otherwise the procedure terminates.

Sequential mode transfer of gating functions begins upon entering box 96. As illustrated in box 96, one or more gating functions are written to a predetermined neuron circuit within a neural network co-processors. Although box 96 indicates a microprocessor writing the gating functions, it will be apparent to one of ordinary skill that a DMA control means may write the values.

Next, as illustrated in decision box 98, a check is made to determine whether there are any further gating functions to be written to the co-processors. If there are more gating functions to be written, then the procedure returns to box 86, otherwise the procedure terminates.

Figure 10:
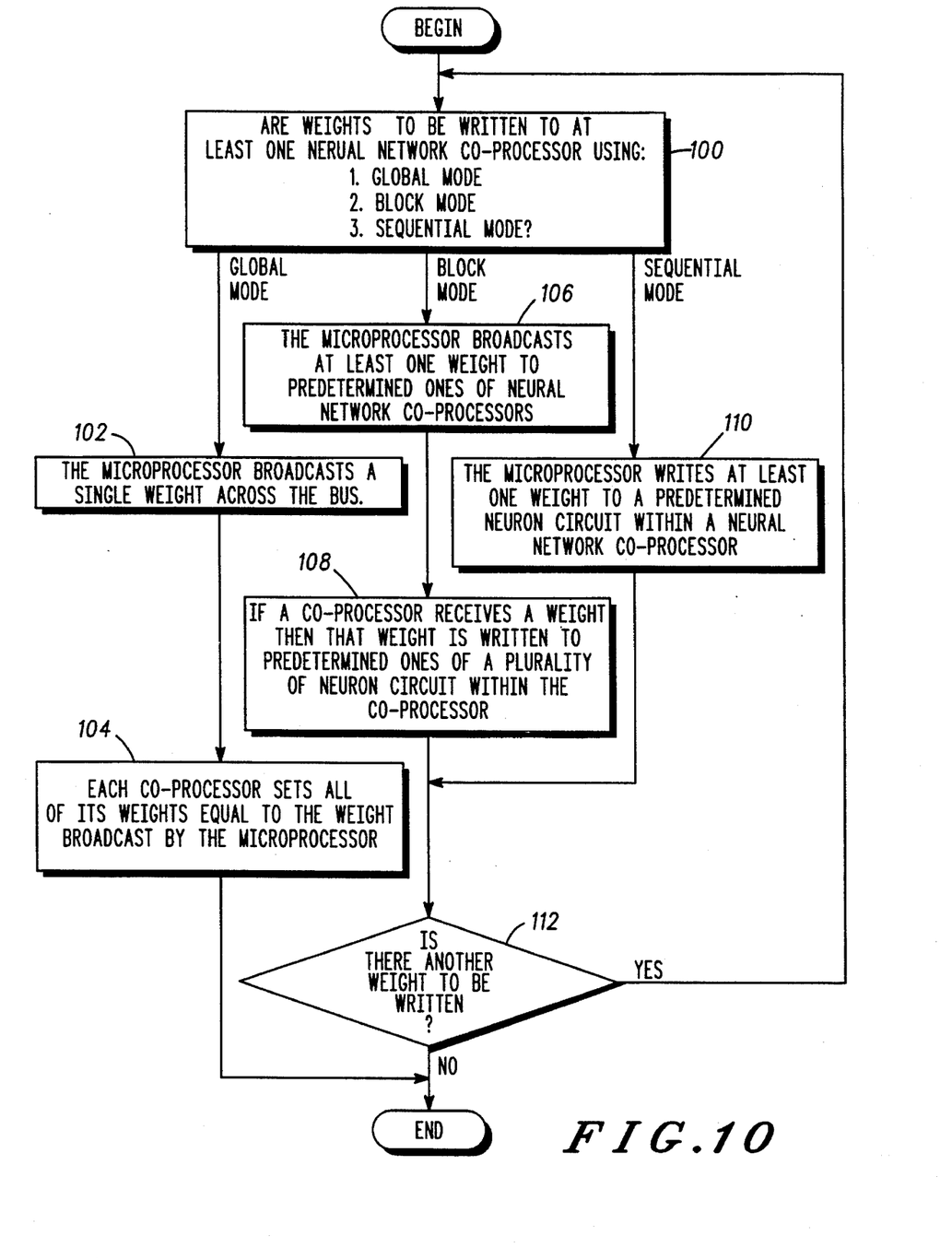
FIG. 10 shows a method of writing weight values to the neural network co-processor in accordance with a preferred embodiment of the invention.

FIG. 10 shows a method of writing weights to the neural network co-processor in accordance with a preferred embodiment of the invention. The method described in FIG.

10 is generally similar to that described by FIG. 9, with the exception that in FIG. 10 weights rather than gating functions are being written to the neural network co-processors.

As illustrated in decision box 100, a check is made to determine whether the weights are to be written using global mode, sequential mode, or block mode. If weights are to be written using global mode, then the procedure proceeds to box 102. If weights are to be written using block mode, then the procedure proceeds to box 106. If weights are to be written using sequential mode, then the procedure proceeds to box 110.

Regarding box 102, a global-mode transfer is accomplished by broadcasting a single weight across the bus to all neural network co-processors, wherein there may be one or any number of co-processors attached to the bus. Although box 102 indicates a microprocessor broadcasting the weight, it will be apparent to one of ordinary skill that a DMA control means may broadcast the weight.

Next, as illustrated in box 104, each co-processor sets all of its weights equal to the weight which was broadcast. Upon exiting box 104, the procedure terminates.

Block mode transfer of weights begins upon entering box 106. As illustrated in box 106, one or more weights are simultaneously broadcast to predetermined ones of the neural network co-processors. Although box 106 indicates a microprocessor writing the weights, it will be apparent to one of ordinary skill that a DMA control means may write the weights.

Next, as illustrated in box 108, if a co-processor receives at least one weight, then the at least one weight is written to predetermined ones of a plurality of neuron circuits within the co-processor.

Next, as illustrated in decision box 112, a check is made to determine whether there are any further weights to be written to the co-processors. If there are more weights to be written, then the procedure returns to box 100, otherwise the procedure terminates.

Sequential mode transfer of weights begins upon entering box 110. As illustrated in box 110, one or more weights are written to a predetermined neuron circuit within a neural network co-processors. Although box 110 indicates a microprocessor writing the weights, it will be apparent to one of ordinary skill that a DMA control means may write the weights.

Next, as illustrated in decision box 112, a check is made to determine whether there are any further weights to be written to the co-processors. If there are more weights to be written, then the procedure returns to box 100, otherwise the procedure terminates.

SUMMARY

Thus there has been described herein a concept, as well as several embodiments including a preferred embodiment, of a computing device which comprises a microprocessor for executing command and control programs and at least one neural network co-processor for performing computational intense mathematical functions.

Because the various embodiments of the computing device as herein-described do execute a plurality of mathematical operations concurrently, they perform with a vast reduction in computational time.

Additional, there has been described herein a computing device which computes polynomials, the form of which is determined by weights and gating functions, resulting in a vast reduction in the cost and complexity of programming and implementation.

Furthermore, it will be apparent to those skilled in the art that the disclosed invention may be modified in numerous ways and may assume many embodiments other than the preferred form specifically set out and described above.

It will be understood that the concept of the present invention can vary in many ways. For example, it is a matter of design choice regarding such system structural elements as the number of neural network co-processors, number of neurons or neuron circuits in each co-processor, and the interconnect means between the microprocessor and the at least one neural network co-processor. Such design choices greatly depend upon the integrated circuit technology, type of implementation (e.g. analog, digital, software, etc.), die sizes, pin-outs, and so on.

It will also be apparent that the degree of truncation of the above-mentioned polynomial expansion depends upon the degree of accuracy desired.

Accordingly, it is intended by the appended claims to cover all modifications of the invention which fall within the true spirit and scope of the invention.

What is claimed is:

1. A computing device comprising:

a microprocessor for executing general purpose programs, wherein the microprocessor has at least one output port for transmitting data and at least one input port for receiving data; and a neural network co-processor, operatively coupled to the at least one input port and the at least one output port, for computing at least one mathematical function that includes a polynomial expansion having a form $$y = \sum_{i=1}^{M} w_{i-1} x_1 g_{1i} x_2 g_{2i} \ldots x_n g_{ni}$$

wherein y represents an output of said neural network co-processor $w_{i-1}$ represents a weight value, $x_1, x_2, \ldots, x_n$ represent inputs to said neural network co-processor, $g_{1i}, \ldots, g_{ni}$ represent gating functions and m and n are integers.

2. The computing device recited in claim 1 wherein said computing device is contained on an integrated circuit.

3. The computing device recited in claim 1 wherein said computing device is contained on a printed circuit board.

4. The computing device recited in claim 1 wherein said microprocessor iteratively executes a program, and wherein said co-processor comprises at least one input and at least one output, said program transferring data to said at least one input of said co-processor and said program transferring data from said at least one output of said co-processor.

5. A computing device comprising:

a microprocessor for executing general purpose programs, wherein said microprocessor has at least one output port for transmitting data and at least one input port for receiving data;

a neural network co-processor for performing mathematical computations, wherein said co-processor is responsive to said at least one microprocessor output port and generates at least one output, and wherein said at least one microprocessor input port is responsive to said at least one co-processor output; and DMA control means coupled to said neural network co-processor, for transferring successive ones of a plurality of inputs to said neural network co-processor;

said neural network co-processor comprising:

an input port for receiving successive ones of said plurality of inputs and generating corresponding outputs;

a plurality of neurons, each neuron having at least one input and generating an output;

means for distributing said input port outputs to said at least one input of each of said plurality of neurons; and a plurality of summers each summing the outputs of predetermined ones of said neurons and generating said at least one co-processor output;

each of said neurons comprising:

first memory means, responsive to the output of said input port, for storing at least one weight value, wherein each of said at least one weight values is accessible by said microprocessor, and wherein each of said at least one weight values is accessible by said DMA control means; and second memory means, responsive to the output of said input port, for storing a plurality of gating functions, wherein each of said gating functions is accessible by said microprocessor, and wherein each of said gating functions is accessible by said DMA control means.

6. The computing device recited in claim 5 wherein said neurons comprise a linear transfer function.

7. The computing device recited in claim 5 wherein the outputs of at least some of said neurons may be summed by more than one of said summers.

8. The computing device recited in claim 5 wherein said co-processor comprises at least one input, and wherein said microprocessor iteratively executes a program, said program transferring data to said at least one input of said co-processor, and said program transferring data from said at least one output of said co-processor.

9. The computing device recited in claim 5 wherein said microprocessor executes a program, said program transferring said at least one weight value to said first memory means.

10. The computing device recited in claim 5 wherein said microprocessor executes a program, said program transferring said plurality of gating functions to said second memory means.

11. The computing device recited in claim 5 wherein said computing device is contained on an integrated circuit.

12. The computing device recited in claim 5 wherein said computing device is contained on a printed circuit board.

13. The computing device recited in claim 5 wherein said neural network co-processor computes a polynomial expansion.

14. The computing device recited in claim 13 wherein said polynomial expansion has the form:

$$y = \sum_{i=1}^{m} w_{i-1} x_1^{g_{1i}} x_2^{g_{2i}} \ldots x_n^{g_{ni}}$$

wherein y represents the output of said neural network co-processor;

wherein $w_{i-1}$ represents the weight value for the ith neuron;

wherein $x_1, x_2, \ldots, x_n$ represent inputs to said neural network co-processor;

wherein $g_{1i}, \ldots, g_{ni}$ represent gating functions for the ith neuron which are applied to said inputs; and wherein m and n are integers.

15. The computing device recited in claim 14 wherein each $x_i$ is represented by the function $x_i = f_i(z_j)$, wherein $z_j$ is any arbitrary variable, and wherein the indices i and j are any positive integers.

16. The computing device recited in claim 14 wherein said neural network co-processor computes a truncated version of said polynomial expansion.

17. The computing device recited in claim 13 wherein said polynomial expansion has the form:

$$y = w_0 + \sum_{i=1}^{n} w_i x_i + \sum_{i=1}^{n} w_{f1(i)} x_i^2 + \sum_{i=1}^{n}\sum_{j=i+1}^{n} w_{f2(i,j)} x_i x_j +$$

$$\sum_{i=1}^{n} w_{f3(i)} x_i^3 + \sum_{i=1}^{n}\sum_{j=i+1}^{n} w_{f4(i,j)} x_i^2 x_j + \sum_{i=1}^{n}\sum_{j=i+1}^{n} w_{f5(i,j)} x_i x_j^2 +$$

$$\sum_{i=1}^{n}\sum_{j=i+1}^{n}\sum_{k=i+j+1}^{n} w_{f6(i,j,k)} x_i x_j x_k + \ldots$$

wherein y represents the output of said neural network co-processor;

wherein $w_{i-1}$ represents the weight value for the ith neuron;

wherein $x_i, x_j, x_k$ represent inputs to said neural network co-processor;

wherein n is a positive integer; and wherein $f_{1(i)}$ through $f6_{(i,j,k)}$ are index-generating functions.

18. The computing device recited in claim 13 wherein said polynomial expansion has the form:

$$y = w_0 + w_1 x_1 + w_2 x_2 + \ldots w_i x_i + \ldots + w_n x_n + w_{n=1} x_1^2 +$$

$$\ldots + w_{2n} x_n^2 + w_{2n+1} x_1 x_2 + w_{2n+2} x_1 x_3 + \ldots + w_{3n-1} x_1 x_n +$$

$$w_{3n} x_2 x_3 + w_{3n+1} x_2 x_4 + \ldots w_{2n+(n)(n-1)/2} x_{n-1} x_n + \ldots +$$

$$w_{n-1} x_1^{g_{1N}} x_2^{g_{2N}} \ldots x_n^{g_{nN}} + \ldots$$

wherein y represents the output of the neural network co-processor;

wherein $w_0, w_1, \ldots, w_{N-1}$ represent weight values, N being a positive integer representing the Nth neuron, and the term $w_i$ in general representing the weight value associated with the i+1 neuron;

wherein $x_1, x_2, \ldots, x_n$ represent inputs to said neural network co-processor, n being a positive integer; and wherein $g_{1N}, \ldots, g_{nN}$ represent gating functions for the Nth neuron which are applied to said inputs.

19. The computing device recited in claim 5 wherein said neural network co-processor performs computations based upon an orthogonal function.

20. The computing device recited in claim 19 wherein said orthogonal function is a sine, cosine, exponential, logarithmic, Fourier transformation, Legendre polynomial, or a non-linear function such as a Volterra function or a radial basis function.

21. The computing device recited in claim 5 wherein said neural network co-processor computes a combination of polynomial expansion and orthogonal functions.

22. In a computing device including a microprocessor for executing general purpose programs, said microprocessor having at least one output port for transmitting data and at least one input port for receiving data, and at least one neural network co-processor for performing mathematical computations, said co-processor being responsive to said at least one output port and generating at least one co-processor output, said at least one microprocessor input port being responsive to said at least one co-processor output, said co-processor comprising first memory means for storing gating functions and second memory means for storing weight values, a method of operating said computing device, said method comprising the following steps:

(a) said microprocessor transmitting gating functions to said first memory means;

(b) said microprocessor transmitting weight values to said second memory means;

(c) said microprocessor transmitting at least one co-processor input to said at least one neural network co-processor; and (d) said co-processor computing a mathematical function, utilizing said gating functions, said weight values, and said at least one co-processor input, said co-processor generating said at least one co-processor output as a result of computing said mathematical function.

23. The method recited in claim 22 and further comprising the following steps:

(e) said microprocessor determining whether said at least one co-processor output is ready to be read;
 (i) if so, proceeding to step (f);
 (ii) if not, returning to step (c);
(f) said microprocessor reading said at least one co-processor output; and
(g) returning to step (c).

24. The method recited in claim 22, wherein said computing device further comprises a DMA control means, and wherein steps (a) through (c) and steps (f) and (g) are performed by said DMA control means rather than said microprocessor.

25. The method recited in claim 22, wherein said first memory means includes a plurality of gating function memories, each of said plurality of gating function memories being capable of storing a plurality of said gating functions.

26. The method recited in claim 25, wherein in step (a) said gating functions are transmitted by substeps (a1) through (a7) as follows:

(a1) said microprocessor determining whether said gating functions are to be transmitted to said at least one co-processor using either global mode, block mode, or sequential mode;
 (i) if global mode, proceeding to step (a2);
 (ii) if block mode, skipping steps (a2) and (a3), and proceeding to step (a4);
 (iii) if sequential mode, skipping steps (a2) through (a5), and proceeding to step (a6);
(a2) said microprocessor broadcasting a single gating function to said at least one co-processor;
(a3) said at least one co-processor storing said single gating function in each of said plurality of gating function memories and skipping steps (a4) through (a6);
(a4) said microprocessor broadcasting said gating functions to said at least one neural network co-processor;
(a5) said at least one neural network co-processor receiving said gating functions, and transmitting said gating functions to predetermined ones of said plurality of gating function memories and skipping step (a6);
(a6) said microprocessor transmitting said gating functions to a predetermined one of said plurality of gating function memories;
(a7) determining whether another of said gating functions is to be transmitted;
 (i) if so, returning to step (a1).

27. The method recited in claim 26, wherein said computing device further comprises a DMA control means, and wherein steps (a1) and (a2) and steps (a4) and (a6) are performed by said DMA control means rather than said microprocessor.

28. The method recited in claim 22, wherein said second memory means includes a plurality of weight value memories, each of said plurality of weight value memories being capable of storing at least one weight value.

29. The method recited in claim 28, wherein in step (b) said weight values are transmitted by substeps (b1) through (b7) as follows:

(b1) said microprocessor determining whether said weight values are to be transmitted to said at least one co-processor using either global mode, block mode, or sequential mode;
 (i) if global mode, proceeding to step (b2);
 (ii) if block mode, skipping steps (b2) and (b3), and proceeding to step (b4);
 (iii) if sequential mode, skipping steps (b2) through (b5) and proceeding to step (b6);
(b2) said microprocessor broadcasting a single weight value to said at least one co-processor;
(b3) said at least one co-processor storing said single weight value in each of said plurality of weight value memories and skipping steps (b4) through (b6);
(b4) said microprocessor broadcasting said weight values to said at least one neural network co-processors;
(b5) said at least one neural network co-processor receiving said weight values and transmitting said weight values to predetermined ones of said plurality of weight value memories and skipping step (b6);
(b6) said microprocessor transmitting said weight values to a predetermined one of said plurality of weight value memodes;
(b7) determining whether another of said weight values is to be transmitted;
 (i) if so, returning to step (b1).

30. The method recited in claim 29, wherein said computing device further comprises a DMA control means, wherein steps (b1) and (b2) and steps (b4) and (b6) are performed by said DMA control means rather than said microprocessor.

31. The method of operating a computing device recited in claim 22 wherein the operation of said computing device is based on a polynomial expansion.

32. The method of operating a computing device recited in claim 31 wherein said polynomial expansion has the form:

$$y = \sum_{i=1}^{m} w_{i-1} x_1^{g1i} x_2^{g2i} \ldots x_n^{gni}$$

wherein y represents the output of said neural network co-processor;

wherein $w_{i-1}$ represents the weight value for the ith neuron;

wherein $x_1, x_2, \ldots, x_n$ represent inputs to said neural network co-processor;

wherein $g_{1i}, \ldots, g_{ni}$ represent gating functions for the ith neuron which are applied to said inputs; and wherein m and n are integers.

33. The method of operating a computing device recited in claim 32 wherein each $x_i$ is represented by the function $x_i = f_i(z_j)$, wherein $z_j$ is any arbitrary variable, and wherein the indices i and j are any positive integers.

34. The method of operating a computing device recited in claim 31 wherein the operation of said computing device is based on a truncated version of said polynomial expansion.

35. The method of operating a computing device recited in claim 31 wherein said polynomial expansion has the form:

$$y = w_0 + \sum_{i=1}^{n} w_i x_i + \sum_{i=1}^{n} w_{f1(i)} x_i^2 + \sum_{i=1}^{n} \sum_{j=i+1}^{n} w_{f2(i,j)} x_i x_j +$$

$$\sum_{i=1}^{n} w_{f3(i)} x_i^3 + \sum_{i=1}^{n} \sum_{j=i+1}^{n} w_{f4(i,j)} x_i^2 x_j + \sum_{i=1}^{n} \sum_{j=i+1}^{n} w_{f5(i,j)} x_i x_j^2 +$$

$$\sum_{i=1}^{n} \sum_{j=i+1}^{n} \sum_{k=i+j+1}^{n} w_{f6(i,j,k)} x_i x_j x_k + \ldots$$

wherein y represents the output of said neural network co-processor;

wherein $w_{i-1}$ represents the weight value for the ith neuron;

wherein $x_i$, $x_j$, $x_k$ represent inputs to said neural network co-processor;

wherein n is a positive integer; and wherein $f_{1(i)}$ through $f6_{(i,j,k)}$ are index-generating functions.

36. The method of operating a computing device recited in claim 31 wherein said polynomial expansion has the form:

$$y = w_0 + w_1 x_1 + w_2 x_2 + \ldots w_i x_i + \ldots + w_n x_n + w_{n=1} x_1^2 +$$

$$\ldots + w_{2n} x_n^2 + w_{2n+1} x_1 x_2 + w_{2n+2} x_1 x_3 + \ldots + w_{3n-1} x_1 x_n +$$

$$w_{3n} x_2 x_3 + w_{3n+1} x_2 x_4 + \ldots w_{2n+(n)(n-1)/2} x_{n-1} x_n + \ldots +$$

$$w_{n-1} x_1^{g_1 N} x_2^{g_2 N} \ldots x_n^{g_n N} + \ldots$$

wherein y represents the output of the neural network co-processor;

wherein $w_0$, $w_1$, $\ldots$, $w_{N-1}$ represent weight values, N being a positive integer representing the Nth neuron, and the term $w_i$ in general representing the weight value associated with the i+1 neuron;

wherein $x_1$, $x_2$, $\ldots$, $x_n$ represent inputs to said neural network co-processor, n being a positive integer; and wherein $g_{1N}$, $\ldots$, $g_{nN}$ represent gating functions for the Nth neuron which are applied to said inputs.

37. The method of operating a computing device recited in claim 22 wherein the operation of said computing device is based upon an orthogonal function.

38. The method of operating a computing device recited in claim 37 wherein said orthogonal function is a sine, cosine, exponential, logarithmic, Fourier transformation, Legendre polynomial, or a non-linear function such as a Volterra function or a radial basis function.

39. The method of operating a computing device recited in claim 22 wherein the operation of said computing device is based on a combination of polynomial expansion and orthogonal functions.

40. The method of operating a computing device recited in claim 22 wherein said computing device is contained on at least one integrated circuit.

41. The method of operating a computing device recited in claim 22 wherein said computing device is contained on at least one printed circuit board.

\* \* \* \* \*